Figure 1:
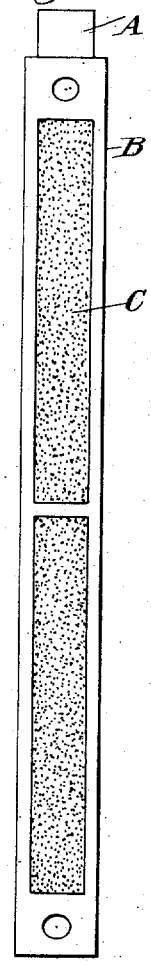

A. O. TATE.
BIFUNCTIONAL STORAGE BATTERY PLATE.
APPLICATION FILED FEB. 18, 1909.

926,710.

Patented June 29, 1909.
6 SHEETS—SHEET 1.

Witnesses:
Edward Rowland
M. F. Keating

Inventor
Alfred O. Tate
By Attorney
Charles J. Kintner

A. O. TATE.
BIFUNCTIONAL STORAGE BATTERY PLATE.
APPLICATION FILED FEB. 18, 1909.

926,710.

Patented June 29, 1909.

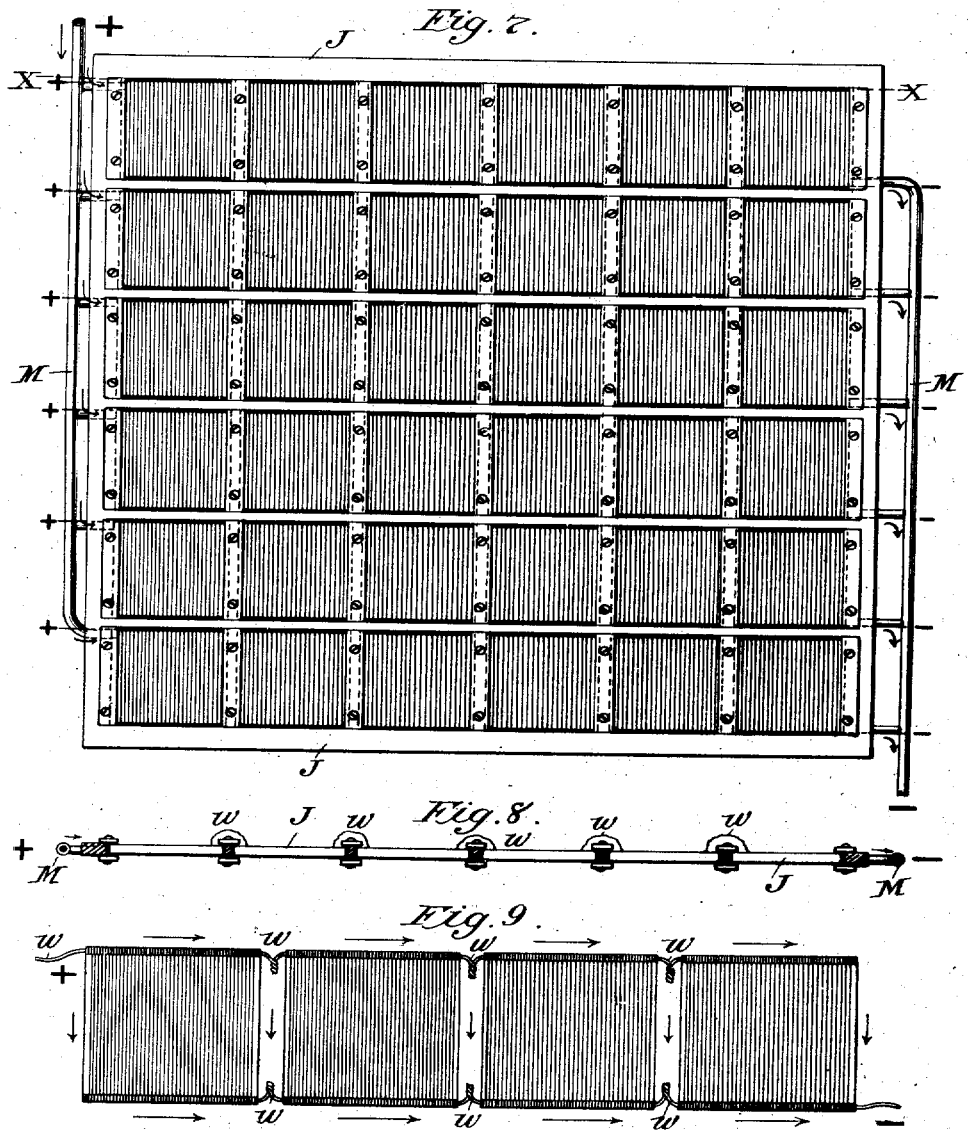

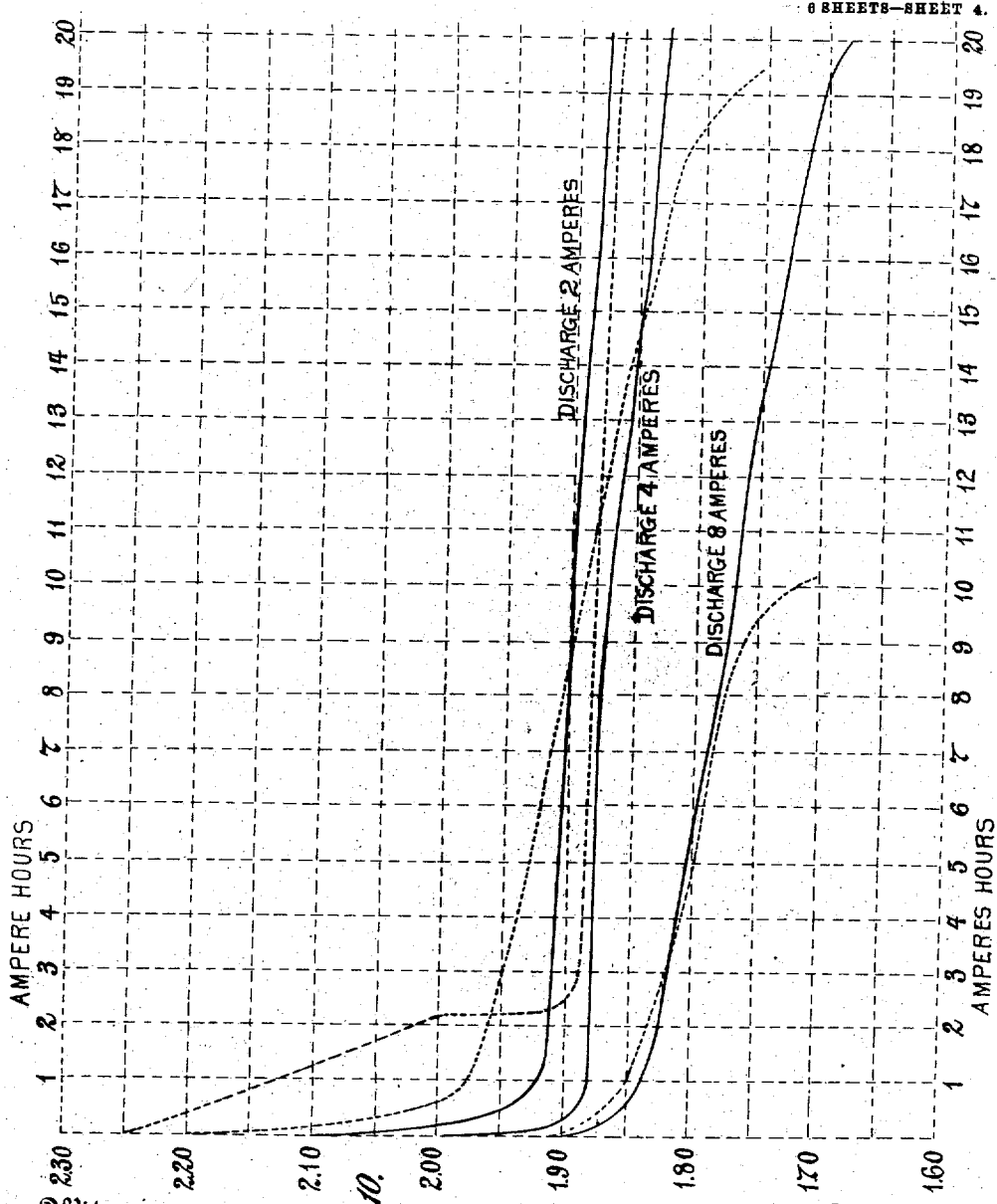

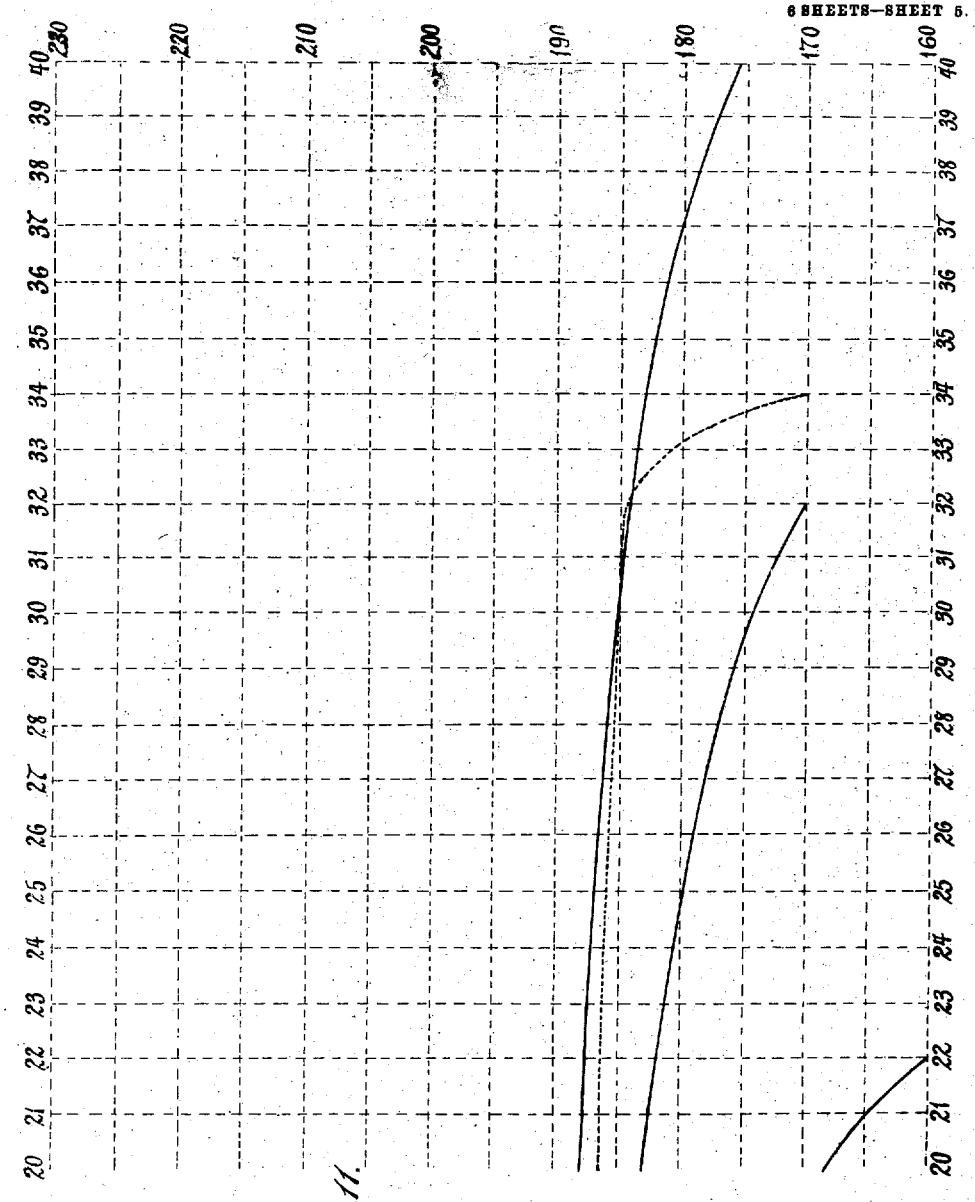

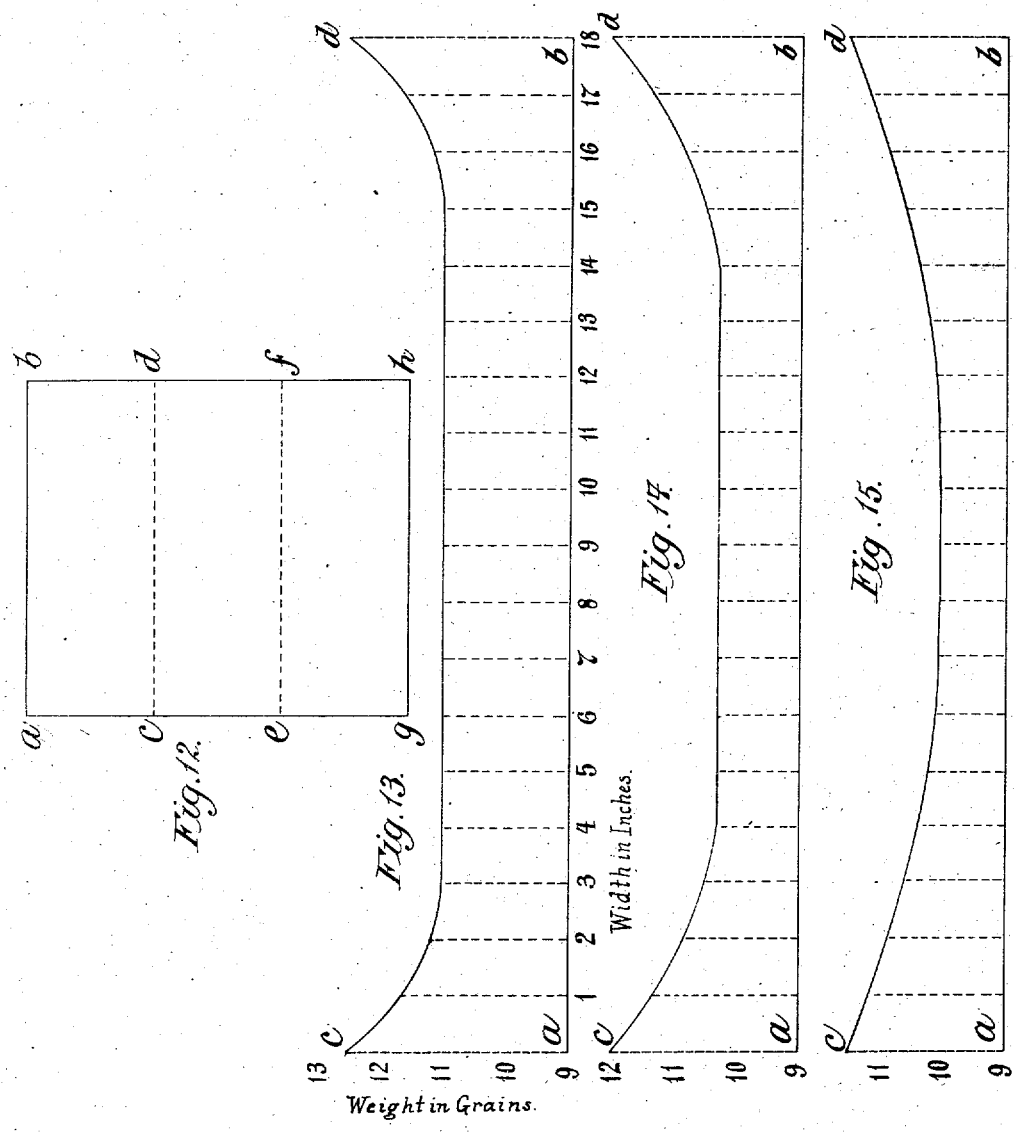

UNITED STATES PATENT OFFICE.

ALFRED O. TATE, OF TORONTO, ONTARIO, CANADA.

BIFUNCTIONAL STORAGE-BATTERY PLATE.

No. 926,710.

Specification of Letters Patent.

Patented June 29, 1909.

Application filed February 18, 1909. Serial No. 478,657.

*To all whom it may concern:*

Be it known that I, ALFRED O. TATE, a subject of the King of Great Britain, and resident of Toronto, Province of Ontario, Dominion of Canada, have made a new and useful Invention in Bifunctional Storage-Battery Plates, of which the following is a specification.

My invention is directed to an improvement in bifunctional storage battery plates of the types disclosed in my U. S. Patents Nos. 880,420; 880,421; 880,422 and 880,423, all bearing date of February 25th, 1908, and its objects are: First, to increase the efficient energy of a bifunctional plate of given weight and dimensions by providing means whereby the circulation of the electrolyte throughout the plate is facilitated, and in consequence whereof the automatic adjustment of the specific gravity of the solution to the demands and requirements of the active material is secured. Second, to provide means whereby bifunctional storage battery plates may be more effectually ventilated so as to thereby afford absolute liberation of all of the gases. Third, to obtain more effective results than have heretofore been possible with bifunctional storage battery plates by arranging individual units of plates of this nature which are so constructed as to afford an effective circulation of the electrolyte and an absolute freedom of all of the generated gases in a multiple relation, thereby largely increasing the effective surface capacity of a plate.

The structural bifunctional plates disclosed in the before-mentioned patents relate more particularly to interleaved anodes and cathodes separated by porous media, and the improvement which forms the subject of this application is directed specifically to these separating media.

I have found in my tests of porous media in a bifunctional plate of the lead-lead type, and more particularly of diaphragms made from porous clay, that they have a tendency to appreciably insulate the active material from the electrolyte through adhesive contact with the former, and also to filter the solution by passing the water with greater freedom than the acid. Both of these conditions operate to curtail the useful energy of the cell; the first by rendering a part of the active material inactive, and the second by the production of high and deleterious acidity at the active surfaces under charge, and insufficient acidity under discharge. In other words, the specific gravity of the cell does not adjust itself with sufficient spontaneity to the normal and essential requirements of the active material in a working plate and my present improvement is designed to correct this condition in the way hereinafter stated.

Figure 2:
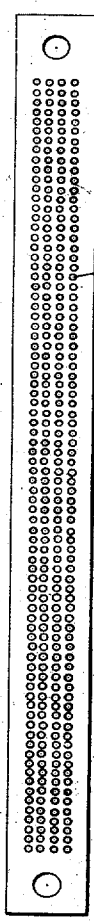
Figure 3:
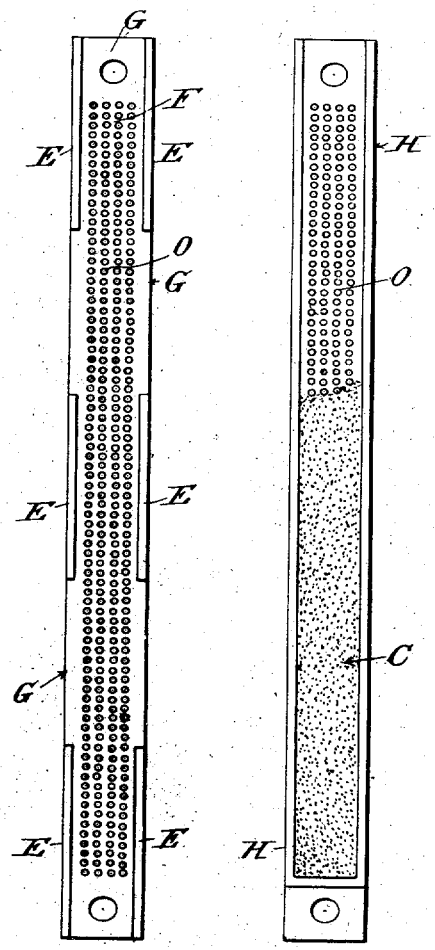
Figure 4:
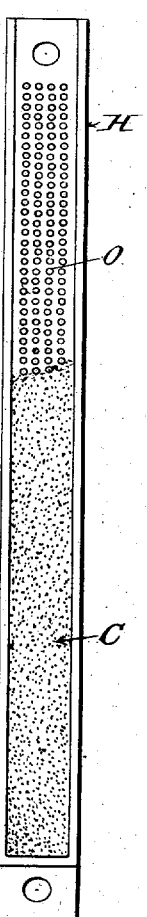
Figure 5:
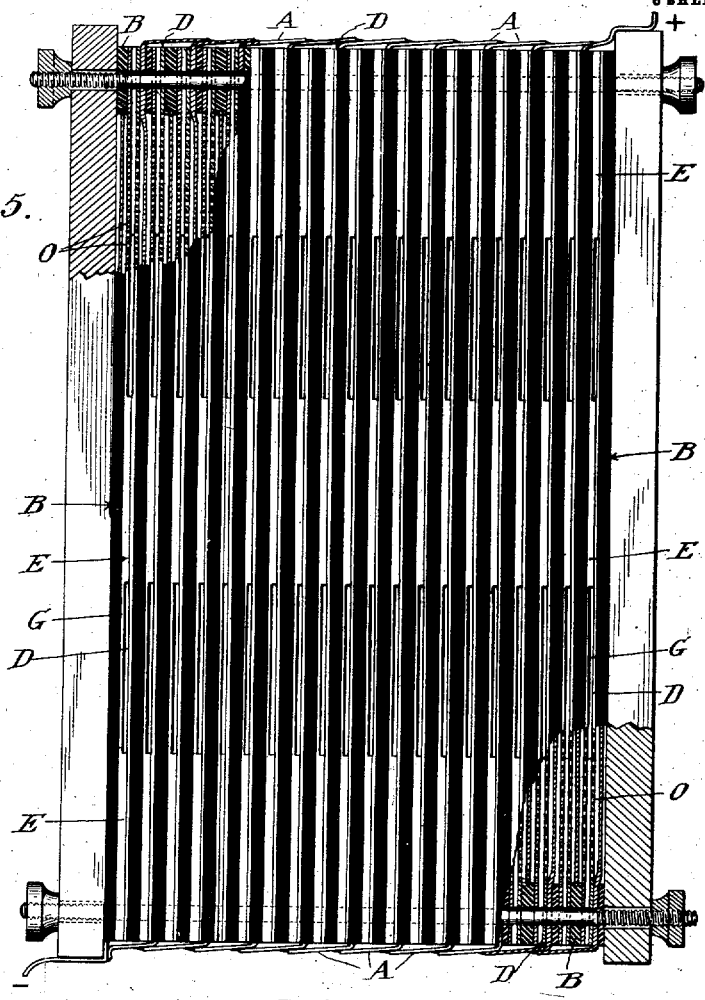
Figure 6:
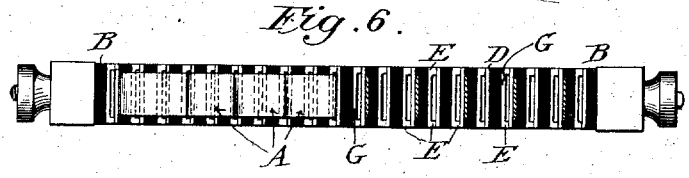

My improvement will be fully understood by referring to the accompanying drawings, in which, Figure 1 is an elevational view of one of the anode or cathode strips and its open supporting and insulating frame, showing also the active material as applied to one of the sides of said strip, these features being substantially similar to the like parts shown and described in my prior patent No. 880,422. Fig. 2 is a similar view of one of my improved vented or perforated mechanical separator strips having holes or openings at each end similar to the openings at the ends of the frame shown in Fig. 1. Fig. 3 is a similar view of a second vented or perforated mechanical separator strip provided with means at its edges for holding the separators apart or away from each other. Fig. 4 is a like view of a modified form of vented or perforated mechanical separator strips for use in a bifunctional plate, like that disclosed in my prior patent No. 880,421. Fig. 5 is a side elevational view of a complete bifunctional plate, full length and half width, said plate embodying the improvements upon my prior inventions as to the individual elements of the plate proper, the upper left hand and the lower right hand corner of this plate being shown in broken sectional view for the purpose of more clearly illustrating the interior structural relation of the parts as to the free circulation of the electrolyte and the release of the gases. Fig. 6 is a plan view as seen looking at Fig. 5 from the top toward the bottom of the drawing, a portion of the interconnected anode strips being broken away to better show the vertically disposed vent channels between the anode and cathode strips for readily permitting of the liberation of the generated gases. Fig. 7 is an elevational view of a multiple unit bifunctional plate and the supporting frame therefor, the same illustrating a further important feature of my invention, in that it shows how I attain numerous advantages due to such multiple interrelation, as hereinafter disclosed. Fig. 8 is a sectional view of the frame or support shown in Fig. 7 on the line X—X and as seen looking thereat from the top toward the bottom of the drawing in the direction of the arrows, the upper edges of six unit bifunctional plates and their connections being shown. Fig. 9 is an elevational view of four bifunctional plates on an enlarged scale, the multiple connections between the anode and cathode strips being shown. Figs. 10 and 11 are diagrammatic views illustrating actual comparison curves of results obtained from bifunctional plates constructed in accordance with the specification and drawings of my prior patent No. 880,422, and from the present specification and drawings, the two sheets of the drawings being placed end to end with Fig. 10 upon the left; the dotted lines representing results from the earlier plate and the full or continuous lines those from the plate disclosed in the present application. Fig. 12 represents in plan view, and on a scale of 1 to 6, a copper plate eighteen inches square and .025 of an inch thick. Figs. 13, 14 and 15 represent in sectional view, and on a scale of 1 to 2, the effects of electrolytic treatment in an electrolytic bath of a plate as shown in Fig. 12 and upon the assumption that the current is applied at the upper edge only of the entire plate.

Referring now to the drawings in detail in which like letters represent like parts wherever used, I will describe the essential structural parts of my improved interleaved bifunctional plate and the distinguishing features which characterize it as a patentable improvement upon the bifunctional storage battery plates disclosed in my prior patents hereinbefore referred to, particularly Patent No. 880,422.

Calling attention first to Figs. 1 to 4 inclusive, B represents an open supporting frame of insulating material, such as hard rubber, for any one of a plurality of anode or cathode strips or ribbons A held in place therein, said frame having bolt holes or openings at its opposite ends, as shown, these frames not being substantially different from the like parts disclosed in my prior patent No. 880,422. C represents the active material held in place as before in the open faces of the frames and on the opposite faces of the strips or ribbons. D and G represent the two component parts of what I term as vented or perforated mechanical separators for performing the quadruple function of (a) holding the anode and cathode strips and their supporting frames apart; (b) maintaining the active material in place; (c) affording a free circulation of the electrolyte to the active material; and (d) freely venting or liberating all of the generated gases which tend to accumulate during use of the plate, and particularly when charging it. These two parts are made of insulating material, as celluloid, hard rubber, etc. and have practically the same superficial area as the frames B, and are provided each with a relatively large number of vent holes or perforations O. I find in practice that excellent results are had in a bifunctional plate of the dimensions hereinafter described and as illustrated in the drawings where the vents or perforations are about 1/50 of an inch in diameter and about 100 per square inch of the surface actually perforated, although I do not limit myself to any specified number thereof. Each of these two mechanical separator strips has holes or openings at its opposite ends similar in dimensions to and calendering with the like holes in the ends of the frames B, B, when secured together by the binding bolts and nuts, as shown in Figs. 5 and 6. That part of the mechanical separator shown in Fig. 3 has on one face at its opposite edges upturned ribs or ledges E, E, there being shown three pairs thereof. It is the function of these ribs or ledges to act as means for holding the two component parts D and G apart from each other a slight distance, so as to effect a number of lateral slots or openings extending entirely through the plate, so as to afford a free circulation of the electrolyte through the entire plate, also permitting it to pass directly through the vents or openings to the active material. Such a structural separator also provides vertical channels or flues extending between each pair of anode and cathode strips for affording a ready outlet for the generated gases. The advantages of these features as an improvement upon the invention disclosed in my prior patent No. 880,422 will be referred to more particularly later on.

In Fig. 4 I have shown one of the mechanical separator components as applicable with the form of bifunctional plate shown in my prior patent No. 880,421, in which the porous insulating strips are grooved to provide pockets or compartments for the reception of active material. Each perforated insulating strip of this form (Fig. 4) is provided on the faces opposite those shown in Figs. 2 and 3 with a continuous bearing of dimensions the same as E E shown in Fig. 3 and illustrated in Fig. 4 by the letter H. This continuous bearing along the edges and bottoms of the strips forms a groove or pocket which is filled with active material C.

The width of all the strips shown in Figs. 1 to 4 is preferably 9/16 of an inch. The width of the perforated sections is preferably 3/8 of an inch. The former conforms with the width of the sectional frames B and the latter with the width of the coating of active material C. The elemental parts shown in Figs. 1, 2 and 3 are assembled in the manner illustrated in Figs. 5 and 6 upon binding bolts provided with nuts, as shown, and the elasticity of all of the parts is such that the binding plates and bolts hold the plate in a secure manner and the "breathing" capacity is fully compensated.

I am aware that perforated plates or sheets of insulating material, such as hard rubber and celluloid, have heretofore been used as separators in storage battery cells of the unifunctional plate type, and I make no claim hereinafter broad enough to include this structure. In this type of cell, which is employed universally in storage battery practice throughout the world to-day, the perforated plate or sheet of insulating material was introduced for the purpose of preventing the short-circuiting of the metallic plates or grids through the distorting phenomenon known as buckling. In so far as the action of such a cell depends upon the freedom of electrolytic circulation and current flow these insulating plates form a positive impediment and their use represents nothing more than a compromise between two obstructive conditions. In contrast to this and as an indication of the improvement I have effected in the previous state of the art relating to bifunctional storage battery plates I direct attention to Figs. 10 and 11 which disclose a set of curves showing discharges at progressive rates of two bifunctional plates constructed in the form revealed in my prior U. S. Patent No. 880,422, of equal dimensions and each carrying the same weight of active material. The dotted lines of discharge indicate the capacity of the plate equipped with porous clay diaphragms, or capillary separators and the full or continuous lines show the capacity of the plate provided with the mechanical separators described in this specification. There are shown three pairs of such curves with discharge rates respectively of 2, 4 and 8 amperes. The marked improvement in the operation of the plate equipped with the latter is due to the freer circulation of the electrolyte which, as shown by the hydrometer, adjusts itself automatically to the demands and requirements of the active material. A like improvement is effected in the operation of charging when gases are freely generated and as freely liberated through the media of the unobstructed flues formed by these mechanical separators. In addition to this the active material shows no tendency to adhere to these perforated strips as it does to porous media, and the electrolyte, therefore, finds a relatively free passage behind them after it enters through the perforations. Furthermore, these strips are sufficiently elastic between their bearings to compensate for the expansion of the active material, which, viewed as a mechanical movement in each active column, is very slight. An exhaustive series of tests have demonstrated definitely that the active material cannot subdivide under any conditions of usage in particles sufficiently fine to enter and escape through the perforations in these strips. They constitute retaining shields equally as effective for that specific purpose as porous media. It will now be seen by anyone skilled in the art of storing electricity, that the adoption of this mechanical separator represents a forward step in the progress of improvement measured by the crucial standard of utility. To further differentiate this improvement from what has hitherto been achieved I particularly direct attention to the fact that these extremely narrow strips of perforated insulating material are in no sense sheets or plates. They are component parts of a structure which do not assume the form of a plate until a relatively large number of these strips have been assembled in proper relation to other component sections. Reference has hereinbefore been made to the fact that these strips are only nine sixteenths of an inch in width and that they cover columns of active material which are only three-eighths of an inch in width. My standard bifunctional plate consists of 25 positive and 26 negative (one split negative) sections. Its dimensions are—

Length (top to bottom) 8 1/4"
Width (across face over all) 9"
Depth (same as width of sectional frames) 9/16"
Width of lateral edges of sectional frames 3/32"

This plate is illustrated and described in my prior U. S. Patent No. 880,422 hereinbefore referred to. I shall now set forth the reasons why it is necessary to restrict the depth of these plates and the width of the columns of active material and, consequently, the width of the perforated strips referred to above, approximately, to the dimensions herein given. These reasons have a direct bearing upon the main subject of this specification and will serve to further demonstrate the utility of the improvements for which I am now applying for Letters Patent.

In my previous specifications, forming part of the U. S. Letters Patent named herein, conspicuous reference was made to the fact that the electrolyte reached the active columns through the lateral edges of intermediate porous strips and the inference that the depth or thickness of the plates was restricted by the absorbing or molecular action of the porous media was, of course, obvious. By substituting, as herein contemplated, a medium that is not dependent upon capillary action for electrolytic circulation but which provides a free and unobstructed channel between the active sections of the plates the question may be asked: Why may not the depth or thickness of these plates be increased indefinitely? And following this idea: Why would we not return to the present well known form of cell consisting of a series of plates separated by perforated insulating media? There are, however, several factors which place a well defined limit upon both the depth and width of the active columns, and in consequence thereof upon the depth or thickness of the bifunctional plate.

Those skilled in the art of storing electricity, particularly through the medium of the lead-lead cell, are familiar with the obstructive chemical reaction termed "sulfating." This phenomenon is commonly met with in the operation of all lead-lead cells of the unifunctional plate type but manifests itself most frequently in cells of the larger forms wherein plate area is increased to meet the demands of relatively heavy work.

In all large installations where storage batteries are employed as auxiliaries to electric lighting plants, or for regulating peak loads in electric power and traction systems, it is common or universal practice to over-charge at frequent intervals to dissipate the effects of sulfating. This not only involves a relatively large monetary expenditure for consumption of current, but imposes a strain upon the battery plates which operate to curtail their term of useful life. This so-called sulfating action in unifunctional plate cells is due to several conditions, each one of which I shall state, and immediately thereafter explain the means I have incorporated in my bifunctional plates for the purpose of eliminating the conditions noted.

In all unifunctional plate cells of the Faure type, and more particularly those of relatively large capacity, the active material is applied to the plates or grids in relatively thick masses, but through more recent investigations it has been ascertained that these masses are inactive beyond a certain well defined limitation of depth under ordinary or so-called normal working conditions. To substantiate this assertion, I refer to a publication entitled "*The Standard Handbook for Electrical Engineers*" printed and issued by the McGraw Publishing Company of New York, 1908, and particularly to section 9, page 14, paragraph 16, where in an article by Messrs. Edward Lyndon and Otis Allen Kenyon, under the caption "Batteries" the following statement is recorded: "The electrolytic action seldom penetrates to a depth greater than one-sixteenth of an inch at ordinary discharge rates, so that where the thickness of the active material measured from the surface of the electrolyte to the conducting plate exceeds this amount the portion in excess of this thickness is practically useless." Two things are obvious as the results of this condition: First, that the inactive material acts as dead resistance to current flow, thereby reducing the useful or working energy of the cell; and second, that it is a constant menace with relation to the obstructive reaction termed sulfating. I believe that the active material in a storage battery cell is transmuted progressively in the performance of its legitimate functions, either in a line extending outwardly from the area of contact with the metallic conductor; or, inwardly from the area in contact with the electrolyte, and that current density and time in conjunction are the essential factors in effecting transmutation. In other words, in the operation of charging, when current flow has been raised to the maximum limit of the cell, the element of time enters in and the duration of the process will depend upon the thickness of the material which is being acted upon. This deduction appears to receive ample confirmation from the process of charging my bifunctional plate herein described. The active columns in this plate are 7 inches long; 3/8 of an inch wide, and about 1/32 of an inch in depth. I have brought one of these plates from complete exhaustion (1.5 volts) to full load (2.2 volts open circuit) in a period of thirty-five minutes without injuring it in the slightest degree, and in charging these plates in sixty minutes, which I have adopted as the minimum time period in practice, I find that the capacity of the plate is reduced by only about 10 per cent., as compared with the results of ordinary charging periods. The application of the active material to the metallic conductors in these plates in the form of films, instead of masses, has not only contributed toward shortening the charging period of the lead-lead cell from a minimum of about six to a minimum of one hour, but has also removed one of the conditions responsible for the obstructive reaction termed sulfating.

It is well understood that there is very appreciable variation of density at different parts throughout the whole mass of any metallic structure and that when this structure assumes the form of a plate or grid any increase of superficial area must correspondingly increase the number of parts wherein this variation occurs. This condition in a metallic electrical conducting medium, such as a plate or grid as universally employed in unifunctional storage battery cells, has a tendency to cause variations of resistance to current flow throughout the metallic mass and corresponding variations in the density of the current delivered to the superimposed or pocketed active material. It, therefore, follows that with each increase of the superficial area of these plates or grids a relatively larger proportion of active material is liable to be subjected to inequalities of current density, and that the hazard of sulfating at those points where current flow is lightest is correspondingly increased. In my bifunctional plate the metallic conductors in contact with the active material are only 8 inches in length, 7/16 of an inch in width and from 1/32 to 1/100 of an inch thick, and these dimensions are maintained under all conditions of usage as explained below. In these relatively short, thin, narrow metallic strips or ribbons the hazard of unequal metallic density, and in consequence thereof unequal current distribution and resultant sulfating is therefore reduced to an absolute minimum. For the purpose of showing the novel mechanical method whereby this condition is maintained in my bifunctional plates, under all conditions of usage, I direct attention to Figs. 7, 8 and 9 of the drawings, particularly to Fig. 7 which illustrates an insulating supporting frame J carrying a series of my novel independent electrodes or bifunctional plates and two bus mains +M and —M. This indicates the manner in which I construct plates of large capacity which are formed of multiples of the individual units. Fig. 9 illustrates how they are connected up in multiple sets of four plates by conductors $w$, $w$. In Fig. 7 there are shown thirty-six such individual plates or units, the upper edges or anode plates thereof being all connected in multiple with the plus pole or bus main +M, and the lower edges thereof similarly connected to the minus pole or bus main —M in charging or discharging. These units are all detachable from the frames individually and in the same manner as is disclosed in my prior patent No. 857,910, granted June 25th, 1907.

With relation to the important factor of internal resistance, it will be noted that these units or individual plates, each representing a superficial area of about 70 square inches, are thus assembled in multiple relation and connected in turn in multiple to the bus mains +M and —M. The width of the exposed lateral edges of the sectional plate frames illustrated in Fig. 1 in the drawings accompanying this specification is 3/32 of an inch. As these sections, representing component parts of the complete unit, are also assembled in multiple relation, as are the sections of all my bifunctional plates herein referred to, it will be readily seen that the factor of internal resistance has been brought to the lowest point possible of attainment through the application of mechanical methods involving the sub-division and multiple grouping of all those parts which, in action, are electrically interrelated.

It is well understood by those skilled in the art that the efficient energy of a storage cell of given size can be increased only by decreasing its internal resistance and it is in this important connection that the value of the improvement which is the main feature of this specification manifests itself.

Having reached the practical limits of mechanical sub-division of electrically interrelated parts, no further improvement could be effected in the direction indicated at any point other than that occupied by the media separating these parts. By substituting the mechanical separator and shield herein described for the capillary separators previously used the internal resistance of my bifunctional plate has been reduced and its efficient energy increased to the significant extent shown by the curves in Figs. 10 and 11. In addition to this the greater freedom of electrolytic contact and circulation secured by means of this mechanical separator eliminates another probable cause of sulfating.

Porous media were used in storage battery cells at the very inception of the art. Attempts have heretofore been made to utilize porous clay plates in unifunctional plate cells for the purpose of retaining the active material in place and they perform this function with mechanical precision. But the fact that they never have been adopted to any appreciable extent in the practice of the art shows that they must possess some disability to offset their mechanical advantages and the nature of this disability I have stated herein. It, of course, becomes more pronounced with each increase of plate area and the foregoing and following explanations will serve to indicate why cells of this type are nowhere employed in storage battery installations of relatively large capacity.

With regard to the generation of current density on the face of a unifunctional storage battery plate, when two such plates—a positive and a negative—are in electrical contact through the medium of the electrolyte, the line of least resistance between them follows a path located above their horizontal centers and along their vertical and horizontal edge areas where so-called extraneous stream lines are given off. The result of this condition is that with given current flow, the superimposed or pocketed active masses are unevenly attacked. Relatively lighter current densities are developed along the vertical central regions and below the horizontal central regions of the plates, and this condition, emphasized with each increase of plate area, is probably the major cause of "sulfating" in storage batteries of the unifunctional plate type, more especially those of relatively large surface capacity as required for electric lighting and peak load regulation.

In my bifunctional plates the current finds entrance at the top and exit at the bottom, or vice versa, of a finely subdivided multiple-assembled unit provided with extremely short conductors, and the line of potential equalization follows, therefore, the exact horizontal center of the plate. There can be no appreciable variation of current density either above or below this line in a vertical direction. In addition to this, by restricting the width of the metallic conducting strips and, correlatively, the active columns applied thereto, the vertical central regions of these conductors and active columns, which in unifunctional plates have a tendency to become isolated with respect to relative current density as plate area is increased, are permanently fixed in close relation to their vertical edge areas, with the result that current flow is again equalized, this time in a horizontal direction, and the equalization of current density over the whole active plate areas is thus achieved with as great a degree of precision as it is possible to attain in the exercise of practical mechanical art. I mean by this that in a unifunctional plate of relatively large superficial area wherein the current is admitted along the upper edge and finds an exit along the bottom edge, the line of potential equalization will follow the exact horizontal center, if metallic resistance throughout the whole plate is assumed to be constant, and that if current density at one designated section of the plate located below the horizontal center be represented by 10 the density of the corresponding section above the horizontal center will also be represented by 10. This method of admitting and releasing the current provides for the equalization of current density in corresponding sections of the plate located in a vertical line above and below the horizontal center, but it does not provide for the equalization of current density between plate sections which do not correspond with respect to relative location along the same line. Equalization in this direction is more closely approximated as the distance between the top and bottom of the plate is shortened, for the reason that as the horizontal line of equalization is approached, potential and, consequently, current density must necessarily diminish to the extent of the progressive expenditure of energy necessary to overcome the resistance of the conducting medium, and this expenditure of energy is in due proportion to the distance traversed. Thus the shortening of the plate or conductor adjusts and equalizes current density in a vertical direction. Again, in a unifunctional plate of relatively large width, as the vertical central regions are approached current density tends to become lighter, for the reason that current flow, somewhat like magnetism and static electricity, has a tendency to seek the more extreme or outer sections of a metallic conducting medium, a manifestation well defined in the process of electroplating. Equalization in this horizontal direction is more closely approximated as the distance between the vertical or lateral edge areas of the plate is decreased. To demonstrate this action I conducted an experiment which is illustrated by Figs. 12, 13, 14 and 15 in the accompanying drawings, in which $a$, $b$, $g$, $h$, Fig. 12 represents, on a scale of 1 to 6, a copper plate .025" thick, 18 inches square, divided into 72 longitudinal sections each 1/4 of an inch in width and 18 inches in length. This plate was again divided into three equal sections by indented lines indicated by $c. d$ and $e. f$, same figure. It was then immersed in a cyanid of copper electroplating bath, distant about 3 inches from the anode and subjected for six hours to a current of 10 amperes under 4 volts E. M. F. admitted through a conductor along the upper edge. A strip of the original sheet of exactly the same dimensions as one of the longitudinal sections of plate, Fig. 12, was divided into three equal parts each of which was found to weigh 9 grains, thus indicating the weight of each subdivided longitudinal section of the complete plate before immersion.
After immersion for the period stated above the plate was removed and dissected. Each longitudinal strip was cut into three equal parts as indicated by the dotted lines $c. d$ and $e. f$, Fig. 12, and the weight of each part ascertained and recorded. In Fig. 13 the straight line $a. b$ represents the plane of upper plate section $a. b. c. d.$, Fig. 12, before electro-plating, as indicated by the weights of its longitudinal sections, and the curved line $c. d$ Fig. 13 shows the same plane after electro-plating and the relation it bears to the former with regard to relative longitudinal sectional weights, indicated in grains.

In Fig. 14 the straight line $a. b$ shows the plane of central plate section $c. d. e. f.$, Fig. 12, in a similar manner before electro-plating and $c. d$, Fig. 14 the same plane after electroplating.

In Fig. 15 the straight line $a. b$ shows the plane of lower plate section $e. f. g. h.$, Fig. 12 before electro-plating and $c. d$, Fig. 15 the same plane after electro-plating, as above.

It will be noted that the horizontal numbers 1 to 18 inclusive (shown below Fig. 13) represent in inches both the width and length of the plate shown in Fig. 12, said latter figure being, as before stated, drawn upon a scale of 1 to 6; while Figs. 13 to 15 inclusive are drawn upon a scale of 1 to 2.
It will also be noted that the numerals 9, wherever shown on the left of Figs. 13, 14 and 15, represent the weight in grains of each one of the individual sections of the plate shown in Fig. 12 before any plating effect was had, which weights were obtained by dividing the total weight of the plate by 72. The numerals 10 to 13 inclusive, 10 to 12 inclusive and 10 to 11 inclusive, on the left of Figs. 13, 14 and 15, represent respectively the weight in grains of the corresponding sections, after the plating effect is had. In the several sectional views illustrated in Figs. 13 to 15 inclusive all of the sections intermediate the outer or end sections in each figure will obviously be of lesser weight than said end sections, as indicated by the vertical dotted lines in each figure.

Each of the three Figs. 13, 14 and 15, taken in its entirety, represents a horizontal cross-sectional elevation of the three plate sections described above and taken respectively along the lines *c. d*, *e. f* and *g. h* Fig. 12, and afford a clear indication of the distribution of metallic deposit over the whole plate area. Inasmuch as the quantity of matter precipitated, deposited or transmuted in an electrolytic cell bears a fixed relation to current quantity and time, and as time in each case was equal with regard to the results of deposition illustrated in Figs. 13, 14 and 15, it follows that current quantity must have been unequal over the sectional face areas of the plate illustrated in Fig. 12, and this, of course, is what occurred. These curves clearly show the inequality of current density on the face of a unifunctional plate and demonstrate the phenomenon that I have described herein as the probable major cause of sulfating in electrical storage battery cells of unifunctional plate type, and particularly those of relatively large superficial area. It will be noted that current density is relatively lighter along the vertical central regions of the plate and relatively heavier above the horizontal center and along the more extreme outer sections.

It is obvious from this visual demonstration that by decreasing the distance between the lateral edge areas of a conducting medium of plate form, in other words, by restricting its width, the equalization of current density in a horizontal direction is more closely approximated and these curves, in conjunction with my explanation regarding the equalization of potential, show also that the same rule applies with regard to current equalization in a vertical direction, for the reason that this shortening and narrowing process tends to eliminate or restrict the extent of those relatively remote central areas which are responsible for unequal current density. These are the conditions which fix, approximately, the standard measurements of my bifunctional plates as given herein, and they show why I have departed from the present method of storing electricity through the medium of conducting plates of relatively large superficial area, and substituted therefor extremely short and extremely narrow metallic conductors and active columns. Moreover, as the lateral edges of these conducting strips are completely insulated by the hollow frames and by other means in the other bifunctional plates referred to herein and access to the vertical edge regions of the active columns largely cut off by the closed bearings of the mechanical separator herein described, the extraneous stream lines of the working unit have been reduced to an absolute minimum and current flow confined to and concentrated upon those parts—the active columns—from which useful energy is derived. Thus the probable major cause of "sulfating" in storage battery cells as heretofore constructed has been totally eliminated in my bifunctional plates.

Reference has hereinbefore been made to the fact that the perforated strips forming the component parts of the mechanical separator which is the subject of this specification act as shields and supports to the active material, and thus serve to maintain the latter permanently in place. The value of this function from the view-point of utility cannot be over-estimated for the following reasons:—The term of useful life of practically all electrical storage batteries, as heretofore constructed, is determined by the periods which mark the disintegration and displacement of the active material. Apart from mechanical jarring and vibration, which may be described as extraneous causes, these disrupting effects are produced by the normal expansion and contraction of the active material, more particularly on the positive plates or grids, in response to the phenomenon of electro-chemical transmutation under charge and discharge, and commonly called "breathing" which has a tendency to loosen and detach the superimposed or pocketed oxid from the supporting plates or grids, and this influence is abetted by the scouring action of the electrolyte produced by circulation. To show that this is a well recognized condition in the art as practiced today in the operation of unifunctional plate cells I direct attention to a report of a stated meeting of the Railway Signal Association, published in their journal, issued at Bethlehem, Pa., U. S. A. Vol. XI, No. 3, July, 1908, and particularly to page 141 thereof where, in the record of a discussion of the storage battery in Signal Service, and under the caption "Sediment", the following statement is made:—"Is the sediment in the bottom of the jar up to or dangerously close to the plates? It should be cleaned out if within one-fourth to one-half inch. Sediment can be removed in several different ways. In the case of small cells, portable or sealed cells, the simplest scheme is probably to dismantle them. Lift out the plates which should be thoroughly washed off, pour out the clear electrolyte, and then remove the sediment and wash out the jar. The plates are then returned to the jar, the electrolyte put back, and sufficient new electrolyte added to cover the plates. In case of stationary batteries, where is is not desirable to dismantle the cells, the sediment can frequently be cleaned out through the use of suitably shaped wooden scoops, and the operation can be carried out without taking the battery out of service at all." It will be noted that the life of these cells is not determined by the electro-chemical exhaustion of the active material, if such be possible, nor essentially through deterioration of the supporting plates or grids, but by the mechanical displacement of the material from which the energy of the cells is derived and which, so displaced, is commonly called "sediment". This energy, primarily, is in direct proportion to the quantity or weight of active material in place and in action, and any loss thereof represents a proportionate loss of energy in the cell. When these unifunctional plate cells reach the point of final exhaustion the quantity of active material present and in place in association with the positive plates or grids is less than the original quantity, and that part which has been displaced is irrevocably lost. Renewal can only be effected and the term of life of the cell extended by providing fresh material in the form of new positive plates or grids.

In my bifunctional plates, through means provided with the vented mechanical separators herein discussed, the active columns are sustained permanently in place. The active material, as previously stated, cannot sub-divide in particles sufficiently fine to enter and escape through the perforations of the protecting shields, and the scouring action of the electrolyte is expended against the exposed faces of these shields and not against the faces of the inclosed and protected active columns. The term of useful life of my bifunctional plates must, therefore, be determined in the first instance by the time periods which will mark the deterioration of the anode conducting strips, through oxidation, to degrees that will so impair their conductivity as to render them unserviceable. The oxidation of the anode strips is caused by the operation of charging and is progressive with relation to time. It will, however, readily be seen that these time periods may be controlled by adjusting the weight of these anode strips, by regulating their thickness, to compensate for the effects of oxidation. When my plate reaches the point of exhaustion described above, the quantity of active material present and in place in association with its anodes is greater than the original quantity, for the reason that a part of the anodes themselves has been raised to an oxid and added to the original quantity. Inasmuch as this condition is progressive throughout the useful life period of my plates they do not show the phenomenon of gradual deterioration which characterizes cells as heretofore constructed. On the contrary, and up to the point where loss of metallic conductivity becomes a factor, their capacity increases progressively through the acquirement of additional active material from the sources named. Thus, by adjusting the weight of the anodes as previously stated, the useful life periods of my bifunctional plates can be largely controlled, an inestimable advantage from the view-point of utility that cannot be realized in the operation of the unifunctional plate cells herein discussed, for reasons that I have either stated or rendered obvious, and in the achievement of this condition the mechanical separator disclosed herein performs a vital function.

The within explanations are made with the object of showing that the perforated strips forming the component parts of the mechanical separator which is the main subject of this specification are not perforated plates, as that term is interpreted and understood in the art, and that their functions are dissimilar. If the depth or thickness of my bifunctional plates were to be increased so that the metallic conducting strips might properly be described as metallic plates, and the perforated strips as perforated insulating plates, current density could not be equalized with the same degree of precision that has now been attained, for the reasons herein set forth, and the reaction termed "sulfating" which has been totally eliminated under practically all conditions would become an obstructive factor in their operation.

As now constructed the only way in which my bifunctional plate can be "sulfated" is by discharging it and permitting it to rest in that condition for a protracted period—a result easily avoided, but inevitable in the case of any lead-lead cell subjected to similar neglect.

The functions of the mechanical separator herein described are three fold. First, it provides a shield or retaining wall which permanently supports and conserves the active columns; second, it constitutes an unobstructed flue or chimney for the liberation of nascent gases and the circulation of the electrolyte; and, third, it aids in cutting off extraneous stream lines and in concentrating current flow along the path lines described by the face areas of the active columns.

I do not limit my improvement to the especial means hereinbefore described and illustrated in the accompanying drawings for effecting the marked improved results attained and as particularly exemplified by the comparison curves shown in Fig. 5, as I believe it is broadly new with me to utilize a vented mechanical separator with a bifunctional storage battery plate in contradistinction to porous absorbing media, such as is disclosed in my prior patents hereinbefore referred to. By the term "vented mechanical separators" hereinbefore used and hereinafter embodied in the claims, I wish to be distinctly understood as meaning any mechanical separator which is provided with a plurality of small holes or openings made for the passage of the electrolyte, and however arranged or disposed so as to afford a free circulation of the same to the active material, and also for affording a full and free liberation of the generated gases.

Having thus described my invention what I claim and desire to secure by Letters Patent of the United States is—

1. A bifunctional storage battery plate embracing anode and cathode strips coated on their opposite faces with active material; in combination with vented separating means between said strips, substantially as described.

2. A bifunctional storage battery plate embracing anode and cathode strips having their edges fully insulated from the electrolyte and their opposite faces coated with relatively thin layers of active material; in combination with vented mechanical separators so constructed as to afford a free circulation of the electrolyte through the plate from side to side and a free access thereof to the active material, substantially as described.

3. A bifunctional storage battery plate embracing interleaved anode and cathode strips and perforated mechanical separators between said strips; together with means for holding the separators apart so as to afford a free circulation of the electrolyte, substantially as described.

4. A bifunctional storage battery plate embracing a plurality of anode and cathode strips, the anode strips being all electrically connected together at one end of the plate, and the cathode strips similarly connected together at the other end thereof; in combination with perforated separators between the strips, and means for holding the separators apart so as to afford a free circulation of the electrolyte, substantially as described.

5. A bifunctional storage battery plate embracing a plurality of interleaved anode and cathode strips held each by an individual frame or support; in combination with perforated mechanical separators and means for holding the same apart so as to afford a free circulation of the electrolyte, substantially as described.

6. A bifunctional storage battery plate embracing a plurality of interleaved anode and cathode strips held each by an individual frame and coated on both faces with active material; in combination with perforated mechanical separators, one resting against the opposite face of each frame, and means for holding said separators apart and against the faces of the frames, substantially as described.

7. A bifunctional storage battery plate embracing a plurality of interleaved anode and cathode strips coated each on its opposite face with active material, a like plurality of open frames for individually securing or holding said strips and active material in place, a plurality of pairs of perforated separators for holding the active material in place within the frames, and means for holding said separators apart; together with means for binding all of said parts into one compact plate, substantially as described.

8. A bifunctional storage battery plate embracing a plurality of anode and cathode strips coated on their opposite faces with active material and separated from each other by perforated mechanical separators of insulating material, substantially as described.

9. A bifunctional storage battery plate embracing a plurality of open frames sustaining each an anode or a cathode strip and acting as a support for active material on opposite faces of such strips, mechanical separators between said frames, said separators being perforated and sustained against the faces of the frames so to admit of free circulation of the electrolyte to the active material on the anodes and cathodes, and also permit of the release of all of the gases, substantially as described.

10. A bifunctional storage battery plate embracing a plurality of open frames having holes or openings at each end, a plurality of anode and cathode strips with like holes at one end only, active material held in place by the frames and on the faces of all of the strips, perforated separators between the adjacent frames provided also with holes or openings at their ends; in combination with means extending through all of the aforesaid holes or openings for binding all the parts together, the anode strips all being electrically connected together at one end and the cathode strips similarly connected at the other end, substantially as described.

11. A bifunctional storage battery plate embracing a plurality of anode and cathode strips combined with mechanical separators therefor vented laterally and vertically, substantially as described.

12. A bifunctional storage battery plate embracing interleaved anode and cathode strips each coated on both faces with active material; together with vented mechanical separators therefor, substantially as described.

13. A bifunctional storage battery plate embracing interleaved anode and cathode strips coated each on both faces with active material; together with vented mechanical separators and means for binding all of said parts together in one compact mass, substantially as described.

14. A bifunctional storage battery plate embracing interleaved anode and cathode strips and vented mechanical separators therefor, the anode strips being all electrically connected at one end and the cathode strips similarly connected at the other end, substantially as described.

15. A bifunctional storage battery plate embracing interleaved anode and cathode strips and vented mechanical separators therefor, the anode strips being all electrically connected at one end and the cathode strips similarly connected at the other end; together with means for binding said parts together in one compact mass, substantially as described.

16. A bifunctional storage battery plate embracing interleaved anode and cathode strips coated each on its opposite faces with active material; in combination with vented mechanical separators, the anode strips being all electrically connected together at one end and the cathode strips all similarly connected at the other end of the plate, substantially as described.

17. A bifunctional storage battery plate embracing a plurality of interleaved anode and cathode strips and insulating separating media therefor having horizontally disposed channels extending through said media from side to side and vertically disposed flues extending from top to bottom of the plate for affording a free circulation of the electrolyte and liberation of all the gases generated, substantially as described.

18. A bifunctional storage battery plate embracing a plurality of open insulating frames, a plurality of anode and cathode strips held one in each frame, a plurality of mechanical separators having channels or openings extending to opposite sides of the plate, and vertically disposed flues extending the entire length of the plate, whereby a free circulation of the electrolyte to all parts of the anodes and cathodes results and a complete liberation of all generated gases is effected, substantially as described.

19. A bifunctional storage battery plate embracing a plurality of open insulating frames, a plurality of anode and cathode strips held one in each frame, a plurality of mechanical separators having channels or openings extending to opposite sides of the plate, and vertically disposed flues extending the entire length of the plate, whereby a free circulation of the electrolyte to all parts of the anodes and cathodes results and a complete liberation of all generated gases is effected: in combination with means for binding all of said parts into one compact mass, substantially as described.

20. A storage battery plate of relatively large capacity embracing a plurality of individual bifunctional plates each consisting of interleaved anode and cathode strips and perforated mechanical separators which afford free circulation of the electrolyte; the anode strips of all the individual plates being connected in multiple circuit to a common conductor and the cathode strips all similarly connected to another conductor, substantially as described.

21. A storage battery plate of relatively large capacity embracing a plurality of individual bifunctional plates each consisting of a plurality of interleaved anode and cathode strips each coated on both sides with active material, perforated mechanical separators for the strips, and means for holding said separators apart so as to afford a free circulation of the electrolyte; the anode strips of all of the individual plates being connected in multiple circuit to a common conductor, and the cathode strips all similarly connected to another conductor, substantially as described.

22. A storage battery plate of relatively large capacity embracing a plurality of individual bifunctional plates each having anode and cathode strips and perforated mechanical separators between the same, means for holding the parts of each plate in fixed or rigid relation, and a main frame or support adapted to detachably support all of said plates; together with additional means for connecting the anode strips of the individual plates in multiple with a common conductor, and like means for similarly connecting all of the cathode strips to a second common conductor, substantially as described.

In testimony whereof I have signed my name to this specification in the presence of two subscribing witnesses.

ALFRED O. TATE.

Witnesses:
C. J. KINTNER,
M. F. KEATING.

---

It is hereby certified that in Letters Patent No. 926,710, granted June 29, 1909, upon the application of Alfred O. Tate, of Toronto, Ontario, Canada, for an improvement in "Bifunctional Storage-Battery Plates," an error appears in the printed specification requiring correction, as follows: In line 121, page 6, the reference-numeral "72" should read 216; and that the proper correction has been made in the files a records of the Patent Office, and is hereby made in said Letters Patent.

Signed and sealed this 3rd day of August, A. D., 1909.

[SEAL.]

F. A. TENNANT,
*Acting Commissioner of Patents.* strips and vented mechanical separators therefor, the anode strips being all electrically connected at one end and the cathode strips similarly connected at the other end; together with means for binding said parts together in one compact mass, substantially as described.

16. A bifunctional storage battery plate embracing interleaved anode and cathode strips coated each on its opposite faces with active material; in combination with vented mechanical separators, the anode strips being all electrically connected together at one end and the cathode strips all similarly connected at the other end of the plate, substantially as described.

17. A bifunctional storage battery plate embracing a plurality of interleaved anode and cathode strips and insulating separating media therefor having horizontally disposed channels extending through said media from side to side and vertically disposed flues extending from top to bottom of the plate for affording a free circulation of the electrolyte and liberation of all the gases generated, substantially as described.

18. A bifunctional storage battery plate embracing a plurality of open insulating frames, a plurality of anode and cathode strips held one in each frame, a plurality of mechanical separators having channels or openings extending to opposite sides of the plate, and vertically disposed flues extending the entire length of the plate, whereby a free circulation of the electrolyte to all parts of the anodes and cathodes results and a complete liberation of all generated gases is effected, substantially as described.

19. A bifunctional storage battery plate embracing a plurality of open insulating frames, a plurality of anode and cathode strips held one in each frame, a plurality of mechanical separators having channels or openings extending to opposite sides of the plate, and vertically disposed flues extending the entire length of the plate, whereby a free circulation of the electrolyte to all parts of the anodes and cathodes results and a complete liberation of all generated gases is effected; in combination with means for binding all of said parts into one compact mass, substantially as described.

20. A storage battery plate of relatively large capacity embracing a plurality of individual bifunctional plates each consisting of interleaved anode and cathode strips and perforated mechanical separators which afford free circulation of the electrolyte; the anode strips of all the individual plates being connected in multiple circuit to a common conductor and the cathode strips all similarly connected to another conductor, substantially as described.

21. A storage battery plate of relatively large capacity embracing a plurality of individual bifunctional plates each consisting of a plurality of interleaved anode and cathode strips each coated on both sides with active material, perforated mechanical separators for the strips, and means for holding said separators apart so as to afford a free circulation of the electrolyte; the anode strips of all of the individual plates being connected in multiple circuit to a common conductor, and the cathode strips all similarly connected to another conductor, substantially as described.

22. A storage battery plate of relatively large capacity embracing a plurality of individual bifunctional plates each having anode and cathode strips and perforated mechanical separators between the same, means for holding the parts of each plate in fixed or rigid relation, and a main frame or support adapted to detachably support all of said plates; together with additional means for connecting the anode strips of the individual plates in multiple with a common conductor, and like means for similarly connecting all of the cathode strips to a second common conductor, substantially as described.

In testimony whereof I have signed my name to this specification in the presence of two subscribing witnesses.

ALFRED O. TATE.

Witnesses:
C. J. KINTNER,
M. F. KEATING.

---

It is hereby certified that in Letters Patent No. 926,710, granted June 29, 1909, upon the application of Alfred O. Tate, of Toronto, Ontario, Canada, for an improvement in "Bifunctional Storage-Battery Plates," an error appears in the printed specification requiring correction, as follows: In line 121, page 6, the reference-numeral "72" should read *216*; and that the proper correction has been made in the files a records of the Patent Office, and is hereby made in said Letters Patent.

Signed and sealed this 3rd day of August, A. D., 1909.

[SEAL.]

F. A. TENNANT,
*Acting Commissioner of Patents.*

It is hereby certified that in Letters Patent No. 926,710, granted June 29, 1909, upon the application of Alfred O. Tate, of Toronto, Ontario, Canada, for an improvement in "Bifunctional Storage-Battery Plates," an error appears in the printed specification requiring correction, as follows: In line 121, page 6, the reference-numeral "72" should read *216;* and that the proper correction has been made in the files a records of the Patent Office, and is hereby made in said Letters Patent.

Signed and sealed this 3rd day of August, A. D., 1909.

[SEAL.]

F. A. TENNANT,
*Acting Commissioner of Patents.*